(12) United States Patent
Busse

(10) Patent No.: US 8,488,045 B2
(45) Date of Patent: Jul. 16, 2013

(54) STEREOSCOPIC CAMERA FOR RECORDING THE SURROUNDINGS

(75) Inventor: Erik Busse, Altenburg (DE)

(73) Assignee: Silicon Micro Sensors GmbH, Dresden (DE)

( * ) Notice: Subject to any disclaimer, the term of this patent is extended or adjusted under 35 U.S.C. 154(b) by 925 days.

(21) Appl. No.: 12/324,011

(22) Filed: Nov. 26, 2008

(65) Prior Publication Data

US 2009/0135247 A1 May 28, 2009

(30) Foreign Application Priority Data

Nov. 26, 2007 (DE) .......................... 10 2007 057 172

(51) Int. Cl.
*H04N 5/225* (2006.01)

(52) U.S. Cl.
USPC ................................ 348/340; 348/48; 348/42

(58) Field of Classification Search
USPC ............................................. 348/42, 46, 340
See application file for complete search history.

(56) References Cited

U.S. PATENT DOCUMENTS

| | | | | | |
|---|---|---|---|---|---|
| 4,942,539 | A | * | 7/1990 | McGee et al. ................. | 700/253 |
| 5,701,154 | A | * | 12/1997 | Dasso ............................. | 348/42 |
| 5,749,827 | A | * | 5/1998 | Minami ......................... | 600/109 |
| 6,156,587 | A | * | 12/2000 | Kayanuma et al. ........... | 438/106 |
| 6,392,688 | B1 | | 5/2002 | Barman et al. | |
| 6,476,417 | B2 | * | 11/2002 | Honda et al. ................... | 257/59 |
| 6,727,564 | B2 | * | 4/2004 | Shinomiya .................... | 257/432 |
| 6,762,796 | B1 | * | 7/2004 | Nakajoh et al. ............... | 348/340 |
| 7,074,638 | B2 | * | 7/2006 | Maeda et al. .................... | 438/75 |
| 7,242,433 | B2 | * | 7/2007 | Tanaka et al. ................. | 348/340 |
| 7,333,147 | B2 | * | 2/2008 | Adachi et al. ................. | 348/374 |
| 7,391,457 | B2 | * | 6/2008 | Fujimoto et al. .............. | 348/340 |
| 7,570,297 | B2 | * | 8/2009 | Maeda et al. .................. | 348/340 |
| 2001/0050721 | A1 | * | 12/2001 | Miyake ......................... | 348/374 |
| 2001/0055073 | A1 | * | 12/2001 | Shinomiya .................... | 348/374 |
| 2002/0167605 | A1 | * | 11/2002 | Akimoto et al. .............. | 348/374 |
| 2003/0025825 | A1 | * | 2/2003 | Nakajoh ........................ | 348/374 |
| 2003/0057359 | A1 | * | 3/2003 | Webster ........................ | 250/216 |
| 2003/0164891 | A1 | * | 9/2003 | Akimoto ....................... | 348/340 |
| 2004/0070667 | A1 | * | 4/2004 | Ando ............................. | 348/46 |

(Continued)

FOREIGN PATENT DOCUMENTS

| | | |
|---|---|---|
| DE | 10259795 A1 | 7/2004 |
| DE | 102004010957 A1 | 9/2005 |
| EP | 1 607 782 | 12/2005 |
| JP | 2006091177 | 4/2006 |

OTHER PUBLICATIONS

European Search Report for EP 08169991.0 dated Mar. 4, 2013.

*Primary Examiner* — Phuoc Nguyen
(74) *Attorney, Agent, or Firm* — Heslin Rothenberg Farley & Mesiti P.C.

(57) ABSTRACT

A stereoscopic camera for recording the surroundings is provided with a right and a left image sensor having one lens each to display the surroundings on the image sensors, with the image sensors and the lenses being held by a carrier side-by-side and at a distance in reference to each other. The stereoscopic camera is additionally provided with a circuit board arranged on the carrier and comprising at least the signal and the supply lines of both image sensors. The image sensors are each mounted on a carrier substrate, which similar to the lenses, are arranged on the carrier and are distanced in reference to the circuit board, and have a flexible electric connection to the circuit board.

7 Claims, 2 Drawing Sheets

U.S. PATENT DOCUMENTS

Figure 1:
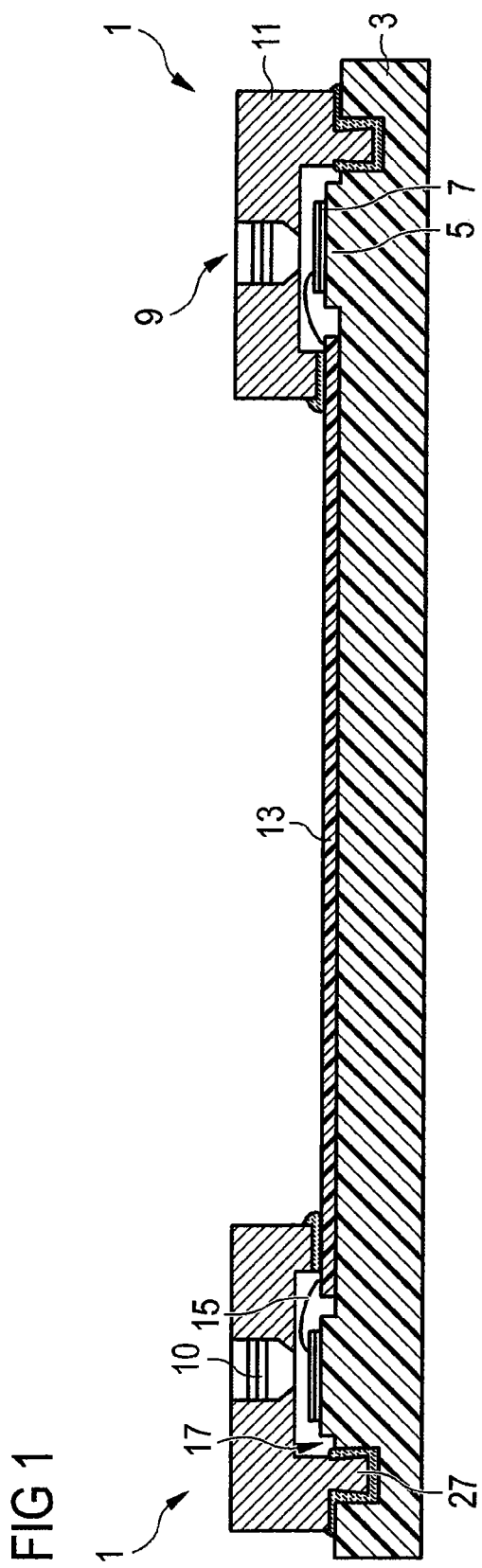

| | | | |
|---|---|---|---|
| 2004/0223072 A1* | 11/2004 | Maeda et al. | 348/340 |
| 2005/0036056 A1* | 2/2005 | Ikemachi et al. | 348/335 |
| 2005/0041195 A1* | 2/2005 | Bone | 349/179 |
| 2005/0205956 A1* | 9/2005 | Oda | 257/432 |
| 2006/0215021 A1* | 9/2006 | Suto et al. | 348/139 |
| 2009/0002532 A1* | 1/2009 | Nishida et al. | 348/294 |
| 2009/0135247 A1* | 5/2009 | Busse | 348/46 |

* cited by examiner

US 8,488,045 B2

STEREOSCOPIC CAMERA FOR RECORDING THE SURROUNDINGS

CROSS-REFERENCE TO RELATED APPLICATIONS

This application claims priority of German application no. 10 2007 057 172.2 filed on Nov. 26, 2007, the entire disclosure of this application is hereby incorporated herein by reference.

BACKGROUND ART

The invention relates to a stereoscopic camera for recording the surroundings with a right and a left image sensor, with one lens each being allocated to display the surroundings on the image sensors, with the image sensors being held by a carrier side by side and at a distance in reference to each other, and with a circuit board arranged on said carrier and provided with at least the signal and the supply lines of both image sensors.

Such stereoscopic cameras are used for various applications, in order to control the movement of a mobile device based on the optic collection and processing of the three-dimensional surroundings. In order to realize the potential functions of the device, its positioning, and also to avoid collisions when in motion it is necessary to constantly detect objects of the surroundings and their distance from the device and to supply it for real-time processing.

It is known to spatially detect the surroundings based on synchronously taking images with two imaging devices that are at a lateral distance in reference to each other when facing the object so that two images of the respective objects of the surroundings from slightly deviating directions are constantly available for processing. These stereoscopic images are subjected to special image processing in order to constantly detect the surroundings in a three-dimensional fashion.

The design of such a stereoscopic camera regularly comprises two electronic image sensors, with a lens being allocated thereto adjusted to the respective application and also the sensor. One image sensor and one lens each form one of the above-described imaging units. The image sensors are mounted on a circuit board, on which signal lines, supply lines, and if applicable at least preliminary signal processing units are arranged.

The circuit board including the described accessories is mounted on a carrier. The lens is arranged above each image sensor at a distance necessary according to the optic system of the lens. It is mounted to the carrier and the circuit board such that the image sensor is entirely encased and light only impinges the image sensors via the lenses. If necessary, the lens has a separate housing therefor.

The carrier and also its connections to the circuit board and the lens or its housing must fulfill various mechanic, thermal, chemical, and electric requirements for the different applications, where here particularly the mechanic stability is to be ensured for the use in mobile devices. For this reason, the carriers are usually made from metal.

Furthermore, the thermal expansion behavior of the carrier and the circuit board mounted fixed on the carrier influences the images taken by the camera. The different expansion coefficients of the two materials connected to each other lead to a displacement of the image sensors in reference to their objects based on the heat created by the electronic components during operation. Therefore, a loss of image quality is detected, e.g., during extended operation of a stereoscopic camera. These interferences are caused, on the one hand, by a displacement of the optic axes of the two recording units in reference to each other due to the different expansion of the carrier and the circuit board. This way, the stereoscopic images no longer overlap each other entirely so that a spatial detection of the surroundings is possible to a limited extent only or not at all. On the other hand, the interferences are caused by diffused light, which impinges an image sensor through defective connections between the carrier and the lens. The connection between the carrier and the lens is usually adhesive connections, which can tear due to the thermal expansions of the carrier and the lens.

BRIEF SUMMARY OF THE INVENTION

The invention is therefore based on the object to provide a stereoscopic camera which ensures a temporarily stable optic of both imaging units per se and in reference to each other, even under thermal and mechanical stress.

The stereoscopic camera described in the following prevents any influence of the optic axes of the two imaging units by the circuit board or the connection of the circuit board to the carrier under mechanical or thermal stress. Both the lenses as well as the image sensors have a mechanical connection to the carrier only.

By uncoupling the lens from the circuit board, the position and the angle of the optic axis can be adjusted very stably in reference to each other. A drift of the optic axes of less than one pixel from the optic axis was determined, both under mechanic impact of up to the 150-fold gravitational acceleration as well as operating temperatures ranging from −20° C. to 70° C. These values could be achieved with a carrier having a lower material thickness than known carriers, so that particularly for high-valued materials cost savings could be achieved.

Furthermore, based on the arrangement of the image sensors on the carrier substrates and due to a flexible contacting between the circuit board and the carrier substrates the known electronic image sensors and lenses can be used. Thus, depending on the design of the lens, image sensors can be used with and without a housing, the image sensors in a housing making it possible to perform the assembly of the camera outside a clean room environment.

The higher mechanical and thermal resistance of the stereoscopic camera is also met when the lens is mounted on the carrier by the lens being arranged above the image sensor via a lens fastener and here creates an optically sealed hollow space around the image sensor, except for the optic path of the lens. This allows a mounting of the lens over a more extensive area, enabling the compensation of mechanical stress between the carrier and the lens fastener while maintaining a joint between the two components to be connected and using flexible joint material to create the connection. This way, any tearing of the connection can be avoided over a wide thermal and mechanical range of stress.

Furthermore, the production of a hollow space around the image sensor also allows the use of open parts, if the performance requirements for the image sensor demand such. Of course, inside the hollow space encased parts can be used just as well.

Further, it is possible by the arrangement of a hollow space around the image sensor and thus around the carrier substrate to protect the flexible electric connection between the image sensor and the circuits of the circuit boards from any damage by the flexible connection being arranged inside the hollow space. For this purpose, the lens fastener has a penetration with the conductor extending into the hollow space. In order to realize a comparable connection at this location, such a joint is also given between the lens fastener and the circuit board, as between the lens fastener and the carrier. This joint with the circuit board is closed in the same manner as the other one with the carrier. For example, silicon shows the necessary adhesive properties, as well as the required flexibility over a wide range of temperatures and the chemical resilience.

The use of the lens fastener also makes it possible to integrate elements in the lens holder, which allow an assembly of the lens, if applicable including an automated one, in the correct position and the correct distance from the image sensor and to permanently ensure said position. Such elements are spaces, for example, adjusting a defined distance between the lens fastener and the carrier, so that the optic system of the lens is precisely adjusted to the image sensor and with its distance being uniform over the entire sensor surface. Similarly, guidance elements are to be integrated as well, which may be provided with an equivalent in the carrier so that the lateral position of the lens in reference to the image sensor is defined.

BRIEF DESCRIPTION OF THE DRAWING FIGURES

In the following, the invention is to be explained in greater detail using an exemplary embodiment. In the respective drawing FIG. 1 shows the essential components of a stereoscopic camera in a cross section, and FIG. 2 shows an imaging unit of a stereoscopic camera according to FIG. 1 in an enlarged illustration.

DETAILED DESCRIPTION

Figure 2:
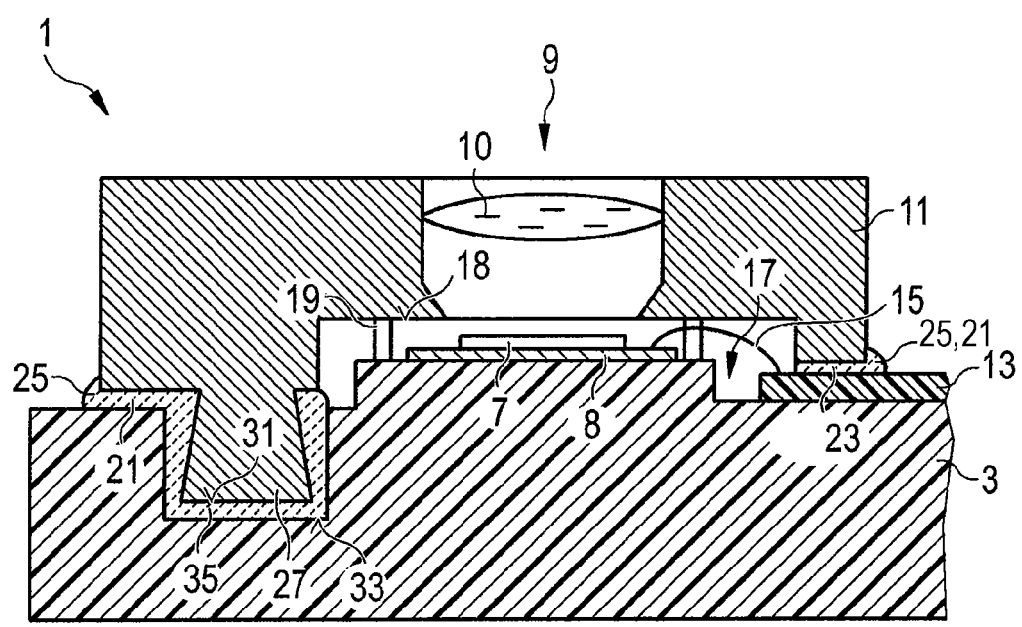

The stereoscopic camera according to FIG. 1 comprises a plate-shaped carrier 3 with a rectangular base, in the present exemplary embodiment made from stainless steel. In its longitudinal extension the carrier 3 has a pedestal 5 at the two ends located opposite each other, on which an electronic image sensor 1 is supported on a flat carrier substrate 8, not shown in greater detail. Each pedestal 5 has a support area slightly larger than the carrier substrate 8.

A lens 9 is arranged via an object fastener 11 above the image sensor 1 and at a distance therefrom. One image sensor 1 and one lens 9 each form a single imaging unit. An optic system shall be called lens 9, comprising various optic elements, such as lenses or mirrors or the like and displaying an object on the image sensor 1. The focus of the lens 9 can be adjusted in a fixed manner in various embodiments, known as a fix-focus system, or be adjustable in the installed condition, so that only after the installation of the lens 9 the focused display of objects of certain distances is adjusted based on the then existing distance between the lens 9 and the image sensor 1.

A circuit board 13 is arranged on the carrier 3 between the two pedestals 5 and at a distance in reference thereto, provided with an electronic circuit (not shown in greater detail) with integrated circuits, active and passive switch elements, and the conductors necessary therefor as well as conductors (not shown in greater detail) for conducting signals to and from the image sensors 1 and for the power supply of the image sensors 1. The electronic switch comprises, for example, a control of the two imaging units, among other things, to synchronously record the images, the power supply for the image sensors 1, or a unit for a preliminary processing of the signals received by the image sensors 1, in which the signals are processed for forwarding to a processing unit. For the signal transmission between these components of the circuit board 13 and the image sensors 1 and for the power supply of the image sensors 1 each carrier substrate 8 of an image sensor 1 is electrically connected to the circuit board 13 via flexible connectors 15. For this application, suitable embodiments from semi-conductor technology are known for the flexible electric connections 15 of components, such as e.g., the connection via wire bridges. The image sensors 1 are in an electric contact by the carrier substrates 8 (not shown in greater detail).

The embodiment of an imaging unit is shown in detail in FIG. 2. The lens fastener 11 of the imaging unit holds, protects, and positions a lens 9, i.e. an optic system to display the objects surrounding the mobile device, and has the shape of a cuboid. The optic system therefore comprises several different optic elements according to the requirements for the imaging; however, for better clarity here only one lens 10 is shown. Standard embodiments of lenses 9 can also be used for the stereoscopic camera described.

The lens fastener 11 has a recess 17 at its side facing the carrier 3, with its base 18 being larger than the pedestal 5, on which the image sensor 1 arranged on a carrier substrate 8 is supported. The lens fastener 11 is arranged on the carrier 3 such that the recess 17 arches over the pedestal 5 and the image sensor 1, having a defined distance between the base 18 of the recess 17 and the image sensor 1. The lens fastener 11 has rod-shaped support bearings 19 in the recess 17 and originating at its base 18, serving as spacers and adjusting a distance between the lens 9 and the image sensor 1 and supporting the lens fastener 11 on the pedestal 5 next to the carrier substrate 8.

According to the height of the support bearings 19 and the height of the pedestal 5, the depth of the recess 17 is embodied such that the lens fastener 11 ends circumferential with a joint 21 above the carrier 3, but not having any further direct mechanical contact thereto than the one via the support bearings 19. The lens fastener 11 also has an equivalent joint 21 in reference to the circuit board 13, extending through a flat penetration or opening 23 in the lens fastener 11 to the hollow space formed by a recess 17 around the pedestal 5. The joint 21 of the lens fastener 11 with the carrier 3 as well as the circuit board 13 is closed circumferentially with a flexible joint material 25, so that based on the optically dense materials of the lens fastener 11 and the joint material 25 the hollow space is embodied in an optically tight manner, with the only potential radiation entering via the lens 9 positioned above the image sensor 1. The use of a flexible joint material 25 makes possible the compensation of thermally caused stress between the usually different materials of the carrier 3 and the lens fastener 11. The optic density not only relates to visible light but can relate to all ranges of wavelengths that can be used for the detection of the surroundings in the respective application.

In the exemplary embodiment shown, the joint material 25 simultaneously fulfills the function of fastening the lens fastener 11 on the carrier 3 having adhesive properties. Alternatively particular fastening means may also be arranged at the lens fastener 11 and the carrier 3.

The fixation of the precise lateral position of the lens fastener 11 in reference to the image sensor 1 and also its angular alignment is realized by providing fastening means 27 at the lens fastener 11, each of which extend into a recess 29 in the carrier 3. By the number, position, and design of the fastening means 27 and recesses 29 it is possible to define an unambiguous allocation of a certain lens fastener 11 in reference to an imaging unit of the stereoscopic chamber and to its exact position so that its assembly is also possible at least in a partially automated fashion. This way, fastening means 27 and recesses 29 of the right and the left imaging unit may be different.

One function of the fastening means 27 is the fixation of the lens fastener 11 in its position even under mechanical stress, because said position is not ensured by the adhesive connection in the above-described adhesion of lens fasteners 11 and carriers 3 by way of a flexible material. For this purpose, the height of the fastening means 27 and the depth of the recess 29 are selected of such a size that a distance remains between the two bases 31, 33 of the fastening means 27 and the recess 29 positioned opposite each other. Simultaneously, the cross sections of fastening means 27 and the recess 29 are of the same size everywhere, so that here too a clear space remains in reference to the lateral wall of the recess 29 circumferentially around the fastening means 27.

The distance and intermediate clear space around the fastening means 27 is filled with a curable mass, which is set in the assembled state of the imaging unit shown. During the curing process, in which the fastening means 27 is enwrapped by the mass, this mass leads to tensile stress on the fastening means 27 in the recess 29 based on the shrinkage connecting with curing, due to the particular shape of the fastening means 27 described in the following and also due to the material present below the fastening means 27.

In order to form an engagement area at the fastening means 27 for the forces acting during the shrinkage process and acting in the recess 29 the fastening means 27 is shaped such that its cross section, i.e. the virtual cross section positioned parallel in reference to the base 31 of the fastening means 27, increases towards the base 31. This shape of the fastening means 27 can be realized, e.g., by a regular conical design. However, other embodiments are also possible, e.g., an irregular or a one-sided cone as shown in FIG. 1, or a gradual increase based on a step, as long as the curable mass during the immersion of the fastening means 27 or during the subsequent filling of the clear space in the recess 29 entirely encloses the fastening means 27 with the mass and the tensile force on the fastening means 27 acting downward by the shrinkage of the mass has an engagement area.

The second of the two imaging units of the camera shown in FIG. 1 is essentially identical as well, however shown mirror-inverted to the one shown in FIG. 2.

The invention claimed is:

1. A stereoscopic camera for recording surroundings, comprising a right image sensor and a left image sensor, a lens associated with each image sensor to display the surroundings on the image sensors, with the image sensors being held next to each other and at a distance in reference to each other by a common carrier underlying the image sensors, and a circuit board arranged atop the carrier and at least provided with signaling and supply lines for both image sensors, wherein each image sensor is mounted on a separate carrier substrate, the lenses and both carrier substrates are arranged atop the carrier and distanced from the circuit board, and the image sensors are connected to the signaling and supply lines via flexible connections, and further comprising a lens fastener for mounting at least one lens above one image sensor, the lens fastener being made from an optically dense material, the lens fastener together with the carrier forming a hollow space around the at least one image sensor by the lens fastener being mounted optically dense atop the carrier, the lens fastener having a opening at a side of the lens fastener, the circuit board extending through the opening to reach into the hollow space providing a joint between the lens fastener and the circuit board, the joint being closed with a flexible and optically dense joint material, the flexible connections being located within said hollow space, and the lens fastener and the carrier substrates being connected to the circuit board only flexibly.

2. A stereoscopic camera according to claim 1, wherein the lens fastener has supports by which the lens fastener rests on the carrier so that a joint develops between the lens fastener and the carrier, the joint being closed by a flexible and optically dense joint material.

3. A stereoscopic camera according to claim 1, wherein the joint material comprises silicon.

4. A stereoscopic camera according to claim 1, wherein the lens fastener has a fastening means extending in a recess in the carrier, with a cross-section of the fastening means parallel to a base of the recess increasing towards the base, the fastening means extending so far into the recess of the carrier that a clear space develops between a base of the fastening means and the base of the recess, and a space of the recess surrounding the fastening means including said clear space is filled with a hardening material.

5. A stereoscopic camera according to claim 1, wherein a focus of the lens is adjustable.

6. A stereoscopic camera according to claim 1, wherein the image sensors are inside a housing.

7. A stereoscopic camera according to claim 1, wherein the carrier is made from metal.

\* \* \* \* \*